United States Patent

Paterson et al.

[15] 3,638,476
[45] Feb. 1, 1972

[54] OIL AND SAMPLING SYSTEM

[72] Inventors: Gerald E. Paterson, 11756 Duart, Houston, Tex. 77024; Daniel D. Compton, 9012 Greiner, Houston, Tex. 77055

[73] Assignee: Esso Research and Engineering Co.

[22] Filed: Dec. 8, 1969

[21] Appl. No.: 882,982

[52] U.S. Cl. ............................................73/61.1 R, 73/422 R
[51] Int. Cl. ...................................G01n 1/10, G01n 33/26
[58] Field of Search......................73/61.1 R, 61, 53, 422 R

[56] References Cited

UNITED STATES PATENTS

| | | | |
|---|---|---|---|
| 2,225,798 | 12/1940 | Price.....................................| 73/422 R |
| 3,003,106 | 10/1961 | Vesper et al. ........................| 73/61 UX |
| 3,222,918 | 12/1965 | Kuntz et al.................................| 73/53 |
| 3,277,710 | 10/1966 | Ball ..................................| 73/61.1 R X |
| 3,385,108 | 5/1968 | Rosso..............................| 73/61.1 R X |
| 3,528,282 | 9/1970 | Stotts, Jr. et al. ...................| 73/61.1 R |

*Primary Examiner*—Louis R. Prince
*Assistant Examiner*—Joseph W. Roskos
*Attorney*—Thomas B. McCulloch, Melvin F. Fincke, John S. Schneider, Sylvester W. Brock, Jr., Kurt S. Myers and Timothy L. Burgess

[57] ABSTRACT

The amount of oil in an oil stream containing water and other separable contaminants flowing through a pipeline is determined by withdrawing from said pipeline a portion of the oil and separating water and other separable contaminants while registering the total flow of oil, the amount of water and other separable contaminants and the net amount of oil over a selected period of time. Apparatus for separating water and other separable contaminants from a representative sample of oil and for determining the amount of water and other separable contaminants automatically and registering the several amounts is described.

11 Claims, 3 Drawing Figures

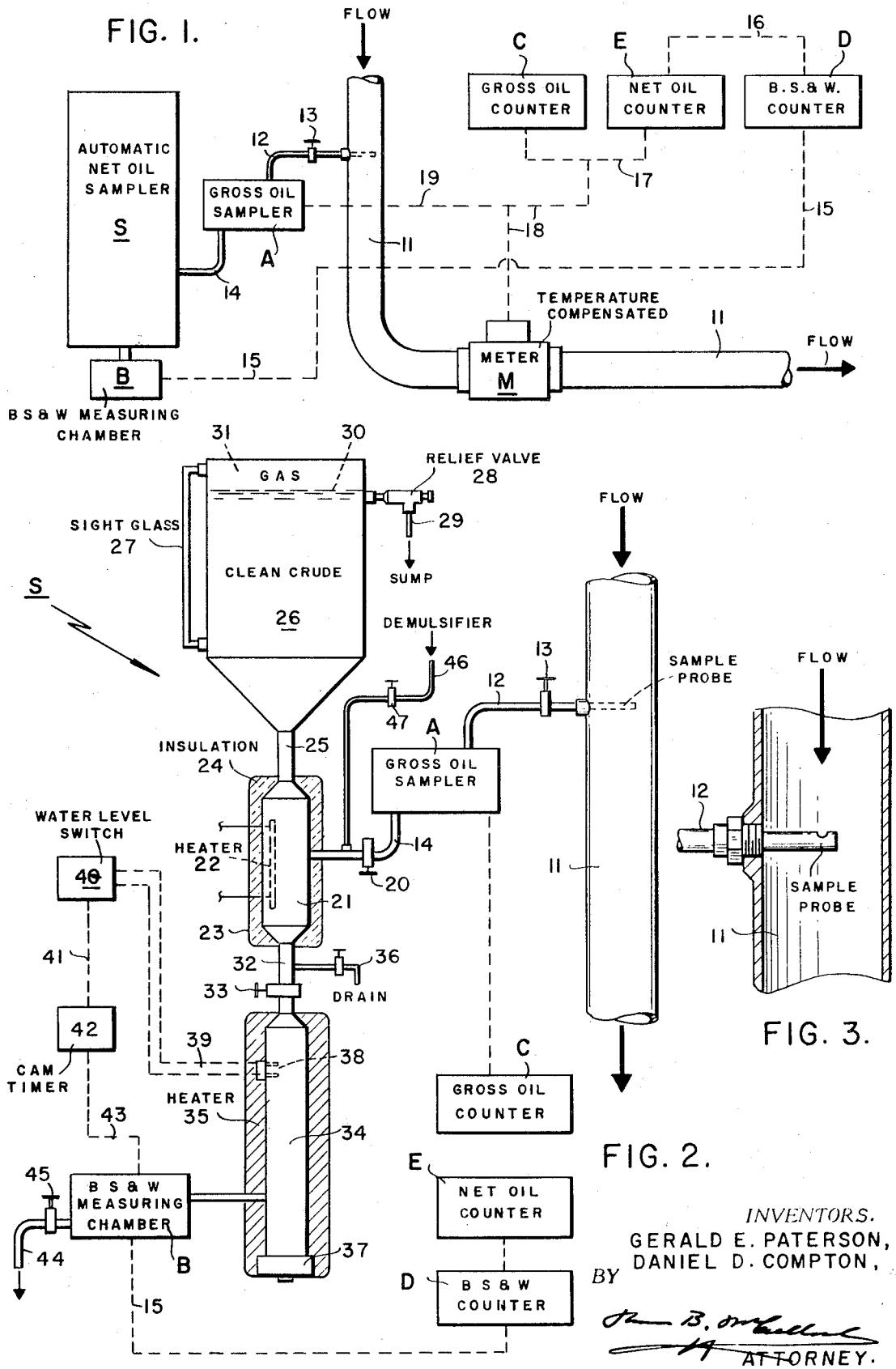

OIL AND SAMPLING SYSTEM

BACKGROUND OF THE INVENTION

1. Field of the Invention

The present invention is directed to an automatic oil system where substantially the amount of oil in a flowing stream is determined. More specifically, the invention is concerned with a method of determining the amount of oil flowing in a pipeline and the like. In its more specific aspects, the invention is concerned with an automatic net oil sampling system where the oil sampled contains water and other separable materials or contaminants.

2. Description of the Prior Art

It is known to measure the volume of fluids such as those flowing from a well or pipeline wherein mass, constant volume meters or positive displacement meters are employed. It is also known to measure and record automatically properties or quantity of fluid contained in a tank. Devices are available for determining the concentration of an oil-water mixture. Indicators for B.S. & W. in crude petroleum are also known in the art wherein a sample of the oil is taken, separated and the B.S. & W. content determined. Likewise, systems for separating and determining the amount of oil and water in crude petroleum are known. Moreover, pulse counters and indicators are also well known. However, the prior art has not disclosed or made obvious method and apparatus for determining the net oil in a flowing stream of oil which contains oil and small amounts of water and other separable components wherein a sample representative of the flowing stream is obtained and separated to allow determination of the net oil from the withdrawn sample and the flowing stream. Specific U.S. patents considered with respect to this invention include the following listed patents:

U.S. Pat. No. 3,014,362
U.S. Pat. No. 3,096,641
U.S. Pat. No. 3,153,420
U.S. Pat. No. 3,166,929
U.S. Pat. No. 3,192,764
U.S. Pat. No. 3,233,448
U.S. Pat. No. 3,254,523
U.S. Pat. No. 3,308,663

SUMMARY OF THE INVENTION

The present invention may be briefly described and summarized as involving a method and apparatus for determining the amount of oil flowing through a pipeline wherein the oil contains a small amount of water and other separable contaminants commonly called B.S. & W. The water is ordinarily salt water associated with crude petroleum. In the present invention the oil is continuously flowed through a meter in the pipeline, preferably temperature-compensated, and a pulsed signal is obtained from the meter representative of the total flow therethrough; a portion of the oil is withdrawn from the pipeline representative and proportionate to the flow therethrough and water and other separable contaminants such as basic sediment are continuously separated from the withdrawn portion, the amount of which is registered and a signal representative of the amount of B.S. & W. in the oil flowed through the pipeline is obtained.

The invention may also be described and summarized as involving a system for determining and sampling crude petroleum to obtain the net oil flowing through a pipeline involving a meter means, which is preferably temperature-compensated having a total oil registration means connected to the meter for registering total flow through the pipeline and for generating a first signal representative of total flow through the pipeline. Sampling means is provided for obtaining a sample representative of and proportionate to the flow over a selected period of time, the sampling means comprising means for sampling the total flow, means for separating oil from water and other separable contaminants, and means for flowing a selected amount of water and other separable contaminants through a registration means to generate a second signal; a net oil registration means is connected to the sampling means to receive the second signal and register the net amount of oil flowed through the pipeline over said selected period of time.

BRIEF DESCRIPTION OF THE DRAWING

The present invention will be further described with reference to the drawing in which:

FIG. 1 is a schematic view of the present invention;
FIG. 2 is a detailed view of the automatic sampling system; and
FIG. 3 is a fragmentary view illustrating a portion of the device of FIGS. 1 and 2.

DESCRIPTION OF THE DRAWINGS WITH RELATION TO THE PREFERRED MODE AND EMBODIMENTS

Referring now to the drawing and particularly to FIG. 1, numeral 11 designates a pipeline in which a crude petroleum, for example, containing water and other separable contaminants such as B.S. & W. is flowed therethrough in the direction of the arrows.

Arranged in the pipeline 11 is a temperature-compensated meter M which may be a positive displacement meter or any other type of meter suitable for measuring the quantity of the liquids such as crude petroleum flowing in the pipeline; for example, rather than a positive displacement meter, the meter may be a turbine meter or other accurate flow-measuring device.

Connected to the pipeline 11 in this instance shown ahead or upstream from the meter M is a gross oil sampler A which may be a 3- or 4-way valve with an adjustable measuring chamber which is connected to the pipeline 11 by line 12 containing valve 13 which may be connected to a sample probe.

The gross oil sampler A in turn is connected by line 14 to an automatic net oil sampler S shown schematically in FIG. 1 and shown in more detail in FIG. 2.

The automatic net oil sampling system in FIG. 1 includes gross oil sampler A, an automatic net oil sampler S, a gross crude oil counter C, a net crude oil counter E and a B.S. & W. counter D, the latter being connected by line 15 which may be an electric lead or a pneumatic line to B.S. & W. measuring chamber B, which may be identical to gross oil sampler A and which may be a 3- or 4-way valve with adjustable measuring chamber and forms part of the automatic net oil sampler S which is described in more detail in FIG. 2. The B.S. & W. counter D is connected by an electric lead or pneumatic line 16 to the net oil counter E which in turn is connected by electric lead or pneumatic line 17 to gross crude counter C and by electric lead or pneumatic line 18 to temperature-compensated meter M and by branch electric lead or pneumatic line 19 to gross oil sampler A.

Referring now to FIG. 2, the automatic net oil sampler S receives oil from pipeline 11 through a connection, which may contain a sample probe, such as line 12 into gross oil sampler A which is connected to gross oil counter C and flows by line 14 provided with a valve 20 into a vessel 21 which may be provided with a heating means 22 such as an electric strip heater. Surrounding the vessel 21 may be a box-shaped means 23 containing insulation means 24 such as asbestos and the like.

The vessel 21 connects by line 25 to a vessel 26 arranged above the vessel 21 which may be provided with a graduated scale sight glass 27 suitably calibrated to indicate the content of clean oil in vessel 26. The vessel 26 is provided with a relief valve 28 and a line 29 for automatically releasing a portion of the clean oil either to a sump or to a sampling collector or back to pipeline 11 as may be desired. The relief valve 28 may be located to provide a level 30 of crude oil below a body of gas 31 above the body of crude oil. Clean oil vessel 26 may be fitted with a Hycar diaphragm, bladder, or piston, or the like, to separate the clean oil from the gas. Vessel 26 is pressurized and suitably will have a pressure within the range of about 10 to 25 pounds to provide the fluid pressure to actuate the piston displacement of B.S. & W. measuring Chamber B.

Connected to the vessel 21 by line 32 containing valve 33 is a vessel 34 which may be provided with a heating means 35. This heating means may be a strip heater such as heating means 22 or it may be a jacket through which a heating fluid such as steam may be flowed.

It will be noted that line 32 is provided with a valved line 36 for draining purposes.

The lower portion of vessel 34 may be enlarged to provide section 37 in which basic sediment may accumulate.

Arranged in the vessel 34 are vertically spaced apart horizontal probes 38 which are connected by electric leads 39 to a water level switch 40 which in turn is connected by an electric lead 41 to a cam timer 42 which is connected by an electric lead 43 to B.S. & W. measuring chamber B. B.S. & W. measuring chamber B is provided with a line 44 having a valve 45 and which may lead to a sump or other water disposal means. The B.S. & W. measuring chamber B is connected by electric lead or pneumatic line 15 to B.S. & W. counter D as shown in FIGS. 1 and 2.

OPERATION

The system, according to the present invention, functions automatically as follows.

The volume of each sample to be drawn from the oil stream flowing through pipeline 11 is selected as, for example, one milliliter; and for each 10 barrels of gross oil passing through the temperature compensated measurement meter, 1 milliliter of gross oil would be withdrawn. Thus, in effect, 1 milliliter sample withdrawn represents 10 barrels of gross oil. As the sample flows into the vessel 21 it is separated into oil and water and other separable contaminants by the application of heat and/or gravity. For example, the vessel 21 may be heated to about 130° to about 160° F. to aid in the separation. Likewise, if the crude petroleum is resistant to water and basic sediment separation, an oil demulsifier such as one of the many known on the market may be added to tank 21 by line 46 controlled by valve 47.

As the water and oil separate, the oil rises into tank 26 and B.S. & W. flows downwardly into tank 34. When the water level reaches the upper of the probes 38 it causes operation of switch 40 and the cam timer 42 which controls the operation of B.S. & W. measuring chamber B whose displacement volume is identical to the displacement volume of gross oil sampler A's measuring chamber. Thus, in effect, 1 milliliter of B.S. & W. dumped represents 10 barrels of B.S. & W. Simultaneously, a signal is sent to B.S. & W. counter D and as the water level in tank 34 drops below the lower of the probes 38 the switch 40 cuts off and the cam timer 42 stops B.S. & W. measuring chamber B and likewise the signal to the B.S. & W. counter D. Of course, it is realized that the crude petroleum which is sampled is automatically introduced into the gross oil sampler A being controlled by a proportional-to-flow pulsing system, not shown, paced by meter M. Such pulsing systems are well known to the art. Thus, with the net oil counter E automatically subtracting the volume of B.S. & W. from the gross oil counter C it is possible in accordance with the present invention to obtain an accurate measurement of the net oil flowing through the pipeline 11.

It is desirable to obtain a B.S. & W. accuracy of plus or minus 0.025 percent for a system operating at 1 percent B.S. & W. For the condition of 1 percent B.S. & W. the volume per dump of the gross oil sampler A and the B.S. & W. measuring chamber B must show 97.5 percent agreement. For a system operating at 0.50 percent agreement; and for a system operating at 0.20 percent B.S. & W., the volume of the two devices must show 87.5 percent agreement. In accordance with the present invention, a crude oil stream sampled from a coastal field in Texas varied between 0.2 and 0.5 percent B.S. & W. Thus, assuming 0.5 percent, the agreement must be at least 95 percent. In actual operation, the agreement has approached 100 percent.

The present invention has other advantages in that the entire sample of clean oil may be retained, the crude gravity obtained from the clean oil, and a sample may be drained and analyzed if desired.

While the sampling system is quite advantageous and useful, certain crudes may present difficulties in separation, but this may be overcome by using heat and crude demulsifiers. An advantage of the present invention is that a very small sampling rate may be used to determine the net crude oil amount. Thus, in the particular field where an installation has been made, only about 0.6 gal./day is sampled. Yet with this small amount, it is possible to determine the net crude oil flowed through the pipeline.

The nature and objects of the present invention having been completely described and illustrated and the best mode and embodiment contemplated set forth, what we wish to claim as new and useful and secure by Letters Patent is:

1. A method for determining the amount of oil flowing through a pipeline in which said oil contains a small amount of water and other separable contaminants which comprises in sequence:

continuously flowing said oil through a meter located in said pipeline and continuously registering the total flow through said meter and obtaining a first signal representative thereof;

withdrawing from said pipeline a portion of said oil representative of and proportionate to the flow therethrough;

continuously separating water and other separable contaminants from said withdrawn portion;

registering the amount of water and other contaminants separated from said portion and obtaining a second signal representative of the amount of water and other contaminants in said oil flowed through said pipeline; and combining the first and second signals under conditions that the second signal is subtracted from the first signal to obtain a registered signal representative of net flow of oil through said pipeline.

2. A method in accordance with claim 1 in which the meter is temperature-compensated.

3. A method in accordance with claim 1 in which the water and other contaminants are separated by heating the withdrawn portion of oil to separate the water and other contaminants and a selected amount of water and other contaminants are periodically flowed through a registration counter to generate said second signal.

4. An automatic system for determining the amount of oil in an oil stream flowing through a pipeline containing oil and small amounts of water and other contaminants which comprises:

a temperature-compensated meter means arranged in said pipeline;

total oil stream registration means connected to said meter for registering total flow through said pipeline and for generating a first signal representative of the total flow through said pipeline;

sampling means separately connected to said pipeline for sampling said oil stream to obtain a sample representative of and proportionate to the flow through said pipeline over a selected period of time;

said sampling means comprising means for sampling said oil stream, means for separating oil from water and other separable contaminants, and means for flowing a selected amount of water and other contaminants through a registration means to generate a second signal; and net oil stream registration means connected to said sampling means to receive said second signal and register the net amount of oil flowed through said pipeline over said selected period of time.

5. Apparatus in accordance with claim 4 in which the separation means comprises:

a. means for heating said sampled oil stream;

b. a pressurized reservoir arranged above and connected to said heating means for receiving separated oil;

c. a container means connected to and arranged below said heating means for receiving separated water and other contaminants;
d. said container means being provided with vertically spaced-apart electrically conductive probes attached to switch means and timer means; and
e. means connected to said container means for sampling said separated water actuated by said switch means and timer means.

6. An automatic net oil sampler which comprises:

a vertically arranged first vessel provided with means for heating same;

a second vessel adapted to be pressurized and arranged vertically above the first vessel and connected to the first vessel to receive oil therefrom;

a third vessel arranged vertically below the first vessel and connected to the first vessel to receive water and other contaminants therefrom;

vertically spaced-apart electrical probes arranged in said third vessel;

switch means electrically connected to said probes; timer means connected to said switch means;

first sampling means connected to said first vessel and second sampling means connected to said third vessel;

said second sampling means being connected to said timer means for actuation of the second sampling means and said first sampling means being adapted to be connected to a pipeline through which oil containing a small amount of water and other contaminants is flowing;

first and second registration means for registering respectively the amount of flow to said first vessel and from said third vessel;

said first sampling means being connected to the first registration means and said second sampling means being connected to the second registration means.

7. Apparatus in accordance with claim 6 in which the third vessel is provided with heating means.

8. Apparatus in accordance with claim 6 in which the second vessel is provided with means for maintaining a selected pressure thereon.

9. Apparatus in accordance with claim 6 in which the first registration means is connected to a meter in a pipeline.

10. Apparatus in accordance with claim 6 in which the second registration means is connected to a third registration means which is connected to the first registration means for subtracting the register of the second registration means from the register of the first registration means.

11. Apparatus in accordance with claim 6 in which:
a. the third vessel is provided with heating means;
b. the second vessel is provided with means for maintaining a selected pressure thereon;
c. the first registration means is connected to a meter in a pipeline; and
d. the second registration means is connected to a third registration means which is connected to the first registration means for subtracting the register of the second registration means from the register of the first registration means.

* * * * *